United States Patent
Hiroki et al.

(10) Patent No.: US 7,300,508 B2
(45) Date of Patent: Nov. 27, 2007

(54) INK COMPOSITION FOR INKJET

(75) Inventors: Masashi Hiroki, Yokohama (JP); Takaya Kitawaki, Izunokuni (JP); Hiroshi Kiyomoto, Hiratsuka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 260 days.

(21) Appl. No.: 11/221,125

(22) Filed: Sep. 6, 2005

(65) Prior Publication Data

US 2007/0051273 A1 Mar. 8, 2007

(51) Int. Cl.
*C09D 11/00* (2006.01)

(52) U.S. Cl. .................................. 106/31.86

(58) Field of Classification Search ............. 106/31.86
See application file for complete search history.

(56) References Cited

FOREIGN PATENT DOCUMENTS

| JP | 2001-220527 A | 8/2001 |
|---|---|---|
| JP | 2002-363465 A | 12/2002 |
| JP | 2003-96370 A | 4/2003 |
| JP | 2003-261808 A | 9/2003 |
| JP | 2004-250502 A | 9/2004 |
| JP | 2004-250503 A | 9/2004 |

OTHER PUBLICATIONS

U.S. Appl. No. 11/413,558, filed Apr. 28, 2006, Inventors: Masashi Hiroki et al, Title: Non-Aqueous Ink Composition for Inkjet.
Related U.S. Appl. No. 11/299,199, filed Dec. 8, 2005; Inventors: Takaya Kitawaki et al.; Title: Non-Aqeuous Ink Composition for Inkjet.
Related U.S. Appl. No. 11/216,976, filed Aug. 31, 2005; Inventors: Masashi Hiroki et al.; Title: Ink Compostion for Inkjet.

*Primary Examiner*—J. A. Lorengo
*Assistant Examiner*—Veronica Faison-Gee
(74) *Attorney, Agent, or Firm*—Frishauf, Holtz, Goodman & Chick, P.C.

(57) ABSTRACT

There is disclosed an inkjet ink composition including a pigment, a dispersing agent, and a solvent. This solvent is constituted by 60-80 wt %, based on an entire quantity of the solvent, of tetraethylene glycol monobutylether, and the balance of aliphatic alcohol having 14 or 16 carbon atoms.

14 Claims, No Drawings

INK COMPOSITION FOR INKJET

BACKGROUND OF THE INVENTION

1. Field of the Invention

This invention relates to an inkjet ink composition.

2. Description of the Related Art

In recent years, a recording apparatus employing an inkjet system has been widely utilized at home, in the office and industry. In the recording apparatus employing an inkjet system, an ink to be employed therein is selected from a water-based ink, a non-aqueous ink and a UV ink depending on applications. Since the water-based ink is cheap and excellent in safety, it is widely used for various applications. The water-based ink however cannot be dried quickly enough to be applied to a high-speed printing. Moreover, when the water-based ink is employed for printing on a plain paper (PPC paper), a phenomenon of so-called cockling where the paper is cockled after the ink has been dried occurs. Since the UV ink can be quickly cured as it is irradiated with ultraviolet ray, the UV ink is suited for use in the printing on a non-absorptive media or in a high-speed printing. However, it is required, in the application of the UV ink, to employ an ultra-violet ray irradiating apparatus which is large in scale and in power consumption.

Whereas, when an oil based ink is employed for the printing on a plain paper, the ink penetrates into a recording paper within a short period of time as soon as drops of ink discharged from an inkjet head are impinged against the paper. Therefore, the oil based ink is suited for use in a high-speed printing without necessitating any special mechanism and is capable of obtaining excellent printed images without generating cockling.

However, since the solvent included in an oil based ink is hardly volatilized, when the oil based ink is printed on a plain paper, the solvent leaves inside the paper, thus raising a problem that printed portions are permitted to look through from the reverse side of paper (or a phenomenon of so-called strike-through). This problem however is now being overcome by optimizing the physical properties of the solvent.

BRIEF SUMMARY OF THE INVENTION

In the office or at home, the printed images are quite frequently preserved in a transparent file such that they are sandwiched between a pair of transparent films. Since most of the transparent file to be employed in the office or at home is made of polypropylene (PP) film, the transparent file is frequently permitted to swell and cockled as the images printed using oil based ink is left sandwiched between the PP films. It may be possible, through the employment of suitable solvent to be included in ink, to prepare an oil based ink which is capable of preventing the swelling of PP film. This oil based ink however is frequently accompanied with bad smell. This problem of smell becomes more serious especially when such an ink composition is employed in the office or at home where any special ventilator is not provided.

An object of the present invention is to provide an inkjet ink composition which is free from smell and capable of exhibiting excellent discharge reliability and makes it possible to print an image of high quality on a plain paper without inviting the swelling or damage of a transparent file which is extensively employed in the office or at home.

According to one aspect of the present invention, there is provided an inkjet ink composition comprising a pigment, a dispersing agent, and a solvent; wherein the solvent is constituted by 60-80 wt %, based on an entire quantity of the solvent, of tetraethylene glycol monobutylether, and the balance of aliphatic alcohol having 14 or 16 carbon atoms.

According to another aspect of the present invention, there is provided an inkjet ink composition comprising a pigment, a dispersing agent, and a solvent; wherein the solvent is constituted by 50-80 wt %, based on an entire quantity of the solvent, of tetraethylene glycol monobutylether, and the balance of aliphatic alcohol having 18 carbon atoms.

According to a further aspect of the present invention, there is provided an inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and triethylene glycol monobutylether, and the balance of aliphatic alcohol having 14 or 16 carbon atoms, the content of the triethylene glycol monobutylether being not more than 50 wt % based on an entire quantity of the solvent.

According to a still further aspect of the present invention, there is provided an inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and diethylene glycol monobutylether, and the balance of aliphatic alcohol having 14 or 16 carbon atoms, the content of the diethylene glycol monobutylether being not more than 20 wt % based on an entire quantity of the solvent.

According to a still further aspect of the present invention, there is provided an inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and triethylene glycol monobutylether, and the balance of aliphatic alcohol having 18 carbon atoms, the content of the triethylene glycol monobutylether being not more than 50 wt % based on an entire quantity of the solvent.

According to a still further aspect of the present invention, there is provided an inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and diethylene glycol monobutylether, and the balance of aliphatic alcohol having 18 carbon atoms, the content of the diethylene glycol monobutylether being not more than 20 wt % based on an entire quantity of the solvent.

Additional objects and advantages of the invention are given in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Next, embodiments of the present invention will be explained.

In the inkjet ink composition according one embodiment of the present invention, a mixture of tetraethylene glycol monobutylether and aliphatic alcohol, which are mixed together at a predetermined ratio, is employed as a solvent.

In this case, the content (wt %) of tetraethylene glycol monobutylether is determined depending on the number of carbon atoms of the aliphatic alcohol. More specifically, when the number of carbon atoms of the aliphatic alcohol is limited to 14 or 16, the content of tetraethylene glycol monobutylether is confined to 60-80 wt % based on an entire quantity of the solvent. Whereas, when the number of carbon atoms of the aliphatic alcohol is limited to 18, the content of tetraethylene glycol monobutylether is confined to 50-80 wt % based on an entire quantity of the solvent.

When the content of tetraethylene glycol monobutylether in the ink composition is smaller than the aforementioned lower limit, the resin film will be damaged by the ink composition. On the other hand, when the content of tetraethylene glycol monobutylether in the ink composition is larger than the aforementioned upper limit, the resultant ink composition may emit a bad smell.

In the inkjet ink composition according another embodiment of the present invention, a mixture consisting of tetraethylene glycol monobutylether, a low viscosity ether selected from triethylene glycol monobutylether and diethylene glycol monobutylether, and aliphatic alcohol of specific kind is employed as a solvent.

In this case, the ratio of polyalkylene glycol monoether which is composed of a mixture of tetraethylene glycol monobutylether and low viscosity ether is determined depending on the number of carbon atoms of the aliphatic alcohol. More specifically, when the number of carbon atoms of the aliphatic alcohol is limited to 14 or 16, the content of polyalkylene glycol monoether is confined to 60-80 wt % based on an entire quantity of the solvent. Whereas, when the number of carbon atoms of the aliphatic alcohol is limited to 18, the content of polyalkylene glycol monoether is confined to 50-80 wt % based on an entire quantity of the solvent.

When the content of polyalkylene glycol monoether in the ink composition is smaller than the aforementioned lower limit, the resin film will be damaged by the ink composition. On the other hand, when the content of polyalkylene glycol monoether in the ink composition is larger than the aforementioned upper limit, there will be raised a problem that the resultant ink composition may emit a bad smell.

Further, the content of low viscosity ether can be determined depending on the kind of the low viscosity ether. More specifically, the content of triethylene glycol monobutylether should be confined to not more than 50 wt % based on an entire quantity of the solvent, and the content of diethylene glycol monobutylether should be confined to not more than 20 wt % based on an entire quantity of the solvent. If these low viscosity ethers are incorporated excessively, the discharge reliability of ink composition may be degraded. More specifically, when a printing apparatus is left to stand for a while after finishing the printing and then the printing is started again using the printing apparatus, a nozzle which is incapable of discharging an ink composition would be generated.

As for tetraethylene glycol monobutylether, it is possible to employ Butycenol 40 (Kyowa Hakko Chemicals Co., Ltd.) for example. As for triethylene glycol monobutylether, it is possible to employ Butycenol 30 (Kyowa Hakko Chemicals Co., Ltd.) for example. As for diethylene glycol monobutylether, it is possible to employ Butycenol 20 (Kyowa Hakko Chemicals Co., Ltd.) for example. These ethylene glycol monobutylethers are featured in that as the molecular weight thereof increases, the viscosity thereof increases. Namely, among three kinds of ethylene glycol monobutylethers, tetraethylene glycol monobutylether is the highest in viscosity.

As for the aliphatic alcohol having 14 carbon atoms, it is possible to employ, for example, isomyristyl alcohol. As for the aliphatic alcohol having 16 carbon atoms, it is possible to employ, for example, isopalmityl alcohol and 2-hexyldecanol. Further, as for the aliphatic alcohol having 18 carbon atoms, it is possible to employ, for example, isostearyl alcohol and oleyl alcohol.

The present inventors have found that when a solvent comprising tetraethylene glycol monobutylether of high viscosity and a specific kind of aliphatic alcohol which are mixed together at a specific ratio is employed, it is possible to obtain an inkjet ink composition which is capable of satisfying all of the conditions including the viscosity at a temperature of 25° C., the quality of image to be obtained, the discharge reliability after being left standing, and the inhibition of damage to film, the inkjet ink composition being moreover free from smell, thereby accomplishing the present invention.

As for the examples of pigments useful in the embodiment of the present invention, they include photoabsorptive pigments for example. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine based pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate (basic dye type chelate, acidic dye-type chelate, etc.); nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridone pigment; quinacridine pigment; and isoindolinone pigment.

As for the pigments that can be employed in the manufacture of a black ink, it is possible to employ Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex 45, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include C.I. Pigment Yellow 128, C.I. Pigment Yellow 129, C.I. Pigment Yellow 151, C.I.

Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, and C.I. Pigment.

As for the pigments that can be employed in a magenta ink, examples thereof include C.I. Pigment Red 122, C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1 and C.I. Pigment Red 112.

Further, as for the pigments that can be employed in a cyan ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

As for the dispersing agent to be employed for dispersing pigment in a solvent, it is possible to employ a pigment dispersing agent which is generally employed in an oil based dispersing medium such as ether. More specifically, it is possible to employ any kind of pigment dispersing agent as long as it is compatible with an oil organic solvent. Specific examples of the pigment dispersing agent include sorbitan fatty acid ester (sorbitan monooleate, sorbitan monolaurate, sorbitan sesquioleate, sorbitan oleate, etc.); polyoxyethylene sorbitan fatty acid ester (polyoxyethylene sorbitan monooleate, polyoxyethylene sorbitan monooleate, etc.); polyethylene glycol fatty acid ester (polyoxyethylene monostearate, polyethylene glycol diisocyanate, etc.); polyoxyethylene alkylphenyl ether (polyoxyethylene nonylphenyl ether, polyoxyethylene octylphenyl ether, etc.); and a nonionic surfactant such as aliphatic diethanol amide, etc.

Further, it is also possible to employ a polymeric dispersing agent, preferably, those having a molecular weight of 1000 or more. For example, it is possible to employ styrene-maleic acid resin, styrene-acrylic resin, rosin, BYK-160, -162, -164, -182 (urethane-based polymer; Big Chemie Inc.), EFKA-47, LP-4050 (urethane-based polymer dispersing agent; EFKA Co., Ltd.), EFKA-4300 (polyacrylate-based polymer dispersing agent; EFKA Co., Ltd.), Solsperse 24000 (polyester-based polymer; Zeneka Co., Ltd.), Solsperse 17000 (aliphatic diethanol amide-based polymer; Zeneka Co., Ltd.), etc.

The inkjet ink composition according to one embodiment of the present invention can be prepared as follows. First of all, ether having high viscosity (tetraethylene glycol monobutylether) is employed as a dispersing agent and mixed with a pigment and a dispersing agent to obtain a mixture, which is then subjected to dispersion treatment by using a dispersing apparatus such as a bead mill. Then, aggregates of pigment, etc. are removed by filter, etc. to obtain a base ink. This base ink is then diluted using a diluent solvent to obtain the inkjet ink composition according to one embodiment of the present invention.

The dilution of the base ink is performed in such a manner that the mixing amount of the diluent solvent is adjusted so as to render the content of tetraethylene glycol monobutylether in the solvent included in the ultimate ink composition fall within a prescribed range. As for the diluent solvent, it is possible to employ a specific kind of aliphatic alcohol or a combination of a specific kind of aliphatic alcohol and a low viscosity ether. Under some circumstances, it is also possible to employ a diluent solvent containing ether having as high viscosity as that of the dispersing medium.

The content of pigment is generally confined to the range of 10 to 50 wt % based on an entire quantity of the ink composition, and the content of dispersing agent is generally confined to the range of 2.5 to 50 wt % based on an entire quantity of the ink composition. Thus, the composition of base ink may be suitably determined so as to enable the ink composition to fall within the aforementioned ranges after the base ink has been diluted with a diluent solvent.

Next, the present invention will be further explained in detail with reference to specific examples. Incidentally, it should be noted that, as long as it is departed from the technical concept of the present invention, the scope of the present invention should not be construed as being restricted by the following examples.

First of all, a base ink was prepared according to the following procedures.

To 50 g of tetraethylene glycol monobutylether 50 (Butycenol 40; Kyowa Hakko Chemicals Co., Ltd.) employed as a dispersion medium was added 30 g of channel black (C.I. No. 77266: Special Black 4A; Dexa Co., Ltd.) as a pigment and 20 g of ethylene oxide-propylene oxide block copolymer as a pigment dispersing agent to prepare a mixture. The resultant mixture was stirred by dispersion mixer and further dispersed by bead mill. Finally, aggregates of pigment, etc. were removed by filter to obtain a base ink 1.

The same procedures as described above were repeated except that the pigment was changed to Hostaperm Yellow H4G (Pig. Y. 151, Clarient) to obtain a base ink 2.

The same procedures as described above were repeated except that the pigment was changed to Hostaperm Pink E-WD (Pig. P. 122, Clarient) to obtain a base ink 3.

The same procedures as described above were repeated except that the pigment was changed to PV Fast Blue 2GLSP (Pig. Blue. 15:3, Clarient) to obtain a base ink 4.

Various kinds of diluent solvents were added to the base ink 1 at a predetermined amount to prepare inkjet ink compositions of Examples of 1 to 20. As for diluent solvents, there were prepared tetraethylene glycol monobutylether (Butycenol 40; Kyowa Hakko Chemicals Co., Ltd.), triethylene glycol monobutylether (Butycenol 30; Kyowa Hakko Chemicals Co., Ltd.), diethylene glycol monobutylether (Butycenol 20; Kyowa Hakko Chemicals Co., Ltd.), isomyristyl alcohol (Fine Oxocol 140N (the number of carbon atoms=14); Nissan Chemicals Co., Ltd.), isopalmityl alcohol (Fine Oxocol 1600 (the number of carbon atoms=16); Nissan Chemicals Co., Ltd.), 2-hexyldecanol (Lithonol 16SP (the number of carbon atoms=16); Higher Alcohol Kogyo Co., Ltd.), isostearyl alcohol (Isostearyl Alcohol EX (the number of carbon atoms=18); Higher Alcohol Kogyo Co., Ltd.), and oleyl alcohol (Oleyl Alcohol VP (the number of carbon atoms=18); Higher Alcohol Kogyo Co., Ltd.).

These diluent solvents were added to the base ink 1 so as to make the content (wt %) thereof based on an entire quantity of solvent become the values shown in the following Tables 1 to 3. Incidentally, the entire quantity of solvent mentioned herein means a total of the quantity of dispersing medium in the base ink and the quantity of diluent solvent employed for dilution. Each of base inks 1 having a diluent solvent incorporated therein was stirred to prepare the ink compositions of Examples 1 to 20.

TABLE 1

| | | Examples | | | | | | |
|---|---|---|---|---|---|---|---|---|
| | | 1 | 2 | 3 | 4 | 5 | 6 | 7 |
| Ether | Tetraethylene glycol monobutylether | 80 | 70 | 60 | 80 | 70 | 60 | 80 |
| | Triethylene glycol monobutylether | | | | | | | |
| | Diethylene glycol monobutylether | | | | | | | |
| Alcohol | Isomyristyl alcohol | 20 | 30 | 40 | | | | |
| | Isopalmityl alcohol | | | | 20 | 30 | 40 | |
| | 2-hexyldecanol | | | | | | | 20 |
| | Isostearyl alcohol | | | | | | | |
| | Oleyl alcohol | | | | | | | |

TABLE 2

| | | Examples | | | | | |
|---|---|---|---|---|---|---|---|
| | | 8 | 9 | 10 | 11 | 12 | 13 |
| Ether | Tetraethylene glycol monobutylether | 70 | 60 | 80 | 70 | 60 | 50 |
| | Triethylene glycol monobutylether | | | | | | |
| | Diethylene glycol monobutylether | | | | | | |
| Alcohol | Isomyristyl alcohol | | | | | | |
| | Isopalmityl alcohol | | | | | | |
| | 2-hexyldecanol | 30 | 40 | | | | |
| | Isostearyl alcohol | | | 20 | 30 | 40 | 50 |
| | Oleyl alcohol | | | | | | |

TABLE 3

| | | Examples | | | | | | |
|---|---|---|---|---|---|---|---|---|
| | | 14 | 15 | 16 | 17 | 18 | 19 | 20 |
| Ether | Tetraethylene glycol monobutylether | 80 | 70 | 50 | 30 | 60 | 30 | 60 |
| | Triethylene glycol monobutylether | | | | 50 | | 50 | |
| | Diethylene glycol monobutylether | | | | | 20 | | 20 |
| Alcohol | Isomyristyl alcohol | | | | 20 | 20 | | |
| | Isopalmityl alcohol | | | | | | | |
| | 2-hexyldecanol | | | | | | | |
| | Isostearyl alcohol | | | | | | 20 | 20 |
| | Oleyl alcohol | 20 | 30 | 50 | | | | |

Further, various kinds of diluent solvents were added to the base ink 1 so as to make the content (wt %) thereof based on an entire quantity of solvent become the values shown in the following Tables 4 and 5, thereby preparing the ink compositions of Comparative Examples 1 to 15.

TABLE 4

| | | Comparative Examples | | | | | | |
|---|---|---|---|---|---|---|---|---|
| | | 1 | 2 | 3 | 4 | 5 | 6 | 7 |
| Ether | Tetraethylene glycol monobutylether | 100 | 90 | 50 | 90 | 50 | 90 | 50 |
| | Triethylene glycol monobutylether | | | | | | | |
| | Diethylene glycol monobutylether | | | | | | | |
| Alcohol | Isomyristyl alcohol | | 10 | 50 | | | | |
| | Isopalmityl alcohol | | | | 10 | 50 | | |
| | 2-hexyldecanol | | | | | | 10 | 50 |
| | Isostearyl alcohol | | | | | | | |
| | Oleyl alcohol | | | | | | | |

TABLE 5

| | | Comparative Examples | | | | | | | |
|---|---|---|---|---|---|---|---|---|---|
| | | 8 | 9 | 10 | 11 | 12 | 13 | 14 | 15 |
| Ether | Tetraethylene glycol monobutylether | 90 | 40 | 90 | 40 | 20 | 50 | 20 | 50 |
| | Triethylene glycol monobutylether | | | | | 60 | | 60 | |
| | Diethylene glycol monobutylether | | | | | | 30 | | 30 |
| Alcohol | Isomyristyl alcohol | | | | | 20 | 20 | | |
| | Isopalmityl alcohol | | | | | | | | |
| | 2-hexyldecanol | | | | | | | | |
| | Isostearyl alcohol | 10 | 60 | | | | | 20 | 20 |
| | Oleyl alcohol | | | 10 | 60 | | | | |

In every ink compositions, the weight of base ink as well as the weight of the diluent solvent to be employed in the dilution were made constant.

Therefore, in all of the ink compositions of Examples 1 to 20 and Comparative Examples 1 to 15, the content of the pigment was 10 wt % based on an entire quantity of ink composition and the content of the pigment dispersing agent was 6 wt % based on an entire quantity of ink composition.

Each of the inkjet ink composition obtained was investigated with respect to the viscosity thereof at a temperature of 25° C. by using a viscometer (TV-33 type viscometer; Tohki Sangyo Co., Ltd.). The results of the investigation thus obtained are summarized in the following Tables 6 to 10. When the easiness of feeding ink at an inkjet head is taken into consideration, the viscosity of ink at a temperature of 25° C. should preferably be not more than 60 mPa·sec or so.

Furthermore, the quality of recorded image, the discharge reliability of ink after ink has been left standing, smelling, and damage to the transparent film of resin file were investigated on the ink compositions of Examples 1 to 20 and Comparative Examples 1 to 15.

In the evaluation of quality of recorded image, a discharge testing apparatus (a recording apparatus) having a piezo-type inkjet head (type: CB1, 318 nozzles; Toshiba Tec Co., Ltd.) mounted thereon was employed to form an image on a plain paper (P-50S copy paper; Toshiba Tec Co., Ltd.).

In the case of the piezo-type inkjet head, the viscosity of ink enabling stable discharging of ink is confined to 5 to 25 mPa·sec. When an ink of high viscosity is to be discharged, the inkjet head is heated to lower the viscosity of ink, thus facilitating the discharge of ink. However, when the temperature of heating the inkjet head is too high, the driving IC mounted on the inkjet head may be damaged. Therefore, the upper limit of the temperature of heating the inkjet head is set to about 70° C.

Since there is a limit to the temperature of heating the inkjet head as described above, it is impossible to sufficiently reduce the viscosity of ink if an ink composition to be discharged is too high in viscosity at a temperature of 25° C. As a result, a nozzle which is incapable of discharging ink is caused to generate, thus generating an image accompanying an unprinted portion. In this investigation, a solid image of 300 dpi was printed as an image and the generation of white line due to unprinted portion was visually determined, thus assessing the printed image according to the following criteria.

○: A normal image which was free from white line

Δ: An image where the first lateral line was distorted in elevational direction

×: An image accompanying a white line due to the generation of nozzle which was incapable of discharging ink Incidentally, "Δ" was considered allowable level.

The results thus obtained are summarized in the following Tables 6 to 10.

The assessment of discharge reliability of ink after the ink had been left standing was performed as follows. First of all, a solid image was printed on a plain paper by using the entire 318 nozzles of the aforementioned inkjet head. Thereafter, the discharge testing device was left to stand as it was for 15 minutes and then another solid image was printed on the paper by using the entire nozzles. The discharge reliability of ink after the ink had been left standing was assessed based on the generation of unprinted portion in the image thus obtained.

Usually, the discharge failure can be recovered by conducting the maintenance operation of the inkjet head. This maintenance operation can be performed by procedures wherein ink is forcedly introduced into the inkjet head and discharged therefrom through the nozzles, and then the ink overflowed from the nozzles is sucked. If a kind of ink which cannot be left standing for a long period of time is to be employed, the aforementioned maintenance operation is required to be performed quite frequently, thereby increasing the consumption of ink or degrading the printing efficiency. In order to obviate these problems, it is desirable to employ an ink which is capable of obtaining a normal printed image even after the discharge testing device is left standing for a while.

The printed image which was obtained after the discharge testing device was left standing for a while was assessed according to the following criteria, the results being summarized in the following Tables 6 to 10.

○: A normal image free from white line (unprinted portion)

×: An image accompanying a white line due to the generation of nozzle which was incapable of discharging ink Further, a test was performed by a group of ten persons or monitors for assessing the smell of each of ink compositions, i.e. by determining if they felt discomfort.

The results thus obtained are summarized in the following Tables 6 to 10.

○: No smelling

×: Felt discomfort due to bad smelling

The investigation of damage to the resin film was performed as follows. First of all, by using each of the inkjet ink compositions, a solid image was printed in an area of ⅓ of A4 size paper. The printed image thus obtained was placed in A4 REFILE (La A21N; Kokuyo Co., Ltd.) and in a transparent pocket file (No. 103; King Jim Co., Ltd.) and preserved therein for 10 days at room temperature (25° C.). Thereafter, the damage, if any, of the resin file due to the deformation of film was assessed according to the following criteria, the results being summarized in the following Tables 6 to 10.

○: Free from deformation

Δ: Film was deformed generating an unevenness of less than 1 mm

×: Film was deformed generating an unevenness of not less than 1 mm

TABLE 6

| | Examples | | | | | | |
|---|---|---|---|---|---|---|---|
| | 1 | 2 | 3 | 4 | 5 | 6 | 7 |
| Viscosity (mPa · s) | 38.7 | 39.2 | 39.7 | 36.9 | 37.5 | 38.1 | 38.0 |
| Quality of image | ○ | ○ | ○ | ○ | ○ | ○ | ○ |
| Discharge reliability after being left standing | ○ | ○ | ○ | ○ | ○ | ○ | ○ |
| Smell | ○ | ○ | ○ | ○ | ○ | ○ | ○ |
| Film damage | ○ | ○ | Δ | ○ | ○ | Δ | ○ |

TABLE 7

| | Examples | | | | | |
|---|---|---|---|---|---|---|
| | 8 | 9 | 10 | 11 | 12 | 13 |
| Viscosity (mPa · s) | 39.1 | 40.3 | 51.7 | 59.8 | 65.8 | 73.2 |
| Quality of image | ○ | ○ | ○ | ○ | Δ | Δ |
| Discharge reliability after being left standing | ○ | ○ | ○ | ○ | ○ | ○ |
| Smell | ○ | ○ | ○ | ○ | ○ | ○ |
| Film damage | ○ | ○ | ○ | ○ | ○ | ○ |

TABLE 8

| | Examples | | | | | | |
|---|---|---|---|---|---|---|---|
| | 14 | 15 | 16 | 17 | 18 | 19 | 20 |
| Viscosity (mPa · s) | 39.0 | 41.0 | 44.5 | 31.1 | 31.0 | 36.9 | 37.6 |
| Quality of image | ○ | ○ | ○ | ○ | ○ | ○ | ○ |
| Discharge reliability after being left standing | ○ | ○ | ○ | ○ | ○ | ○ | ○ |
| Smell | ○ | ○ | ○ | ○ | ○ | ○ | ○ |
| Film damage | ○ | ○ | ○ | ○ | ○ | ○ | ○ |

TABLE 9

| | Comparative Examples | | | | | | |
|---|---|---|---|---|---|---|---|
| | 1 | 2 | 3 | 4 | 5 | 6 | 7 |
| Viscosity (mPa · s) | 35.2 | 36.9 | 41.0 | 36.1 | 39.7 | 36.9 | 42.3 |
| Quality of image | ○ | ○ | ○ | ○ | ○ | ○ | ○ |
| Discharge reliability after being left standing | ○ | ○ | ○ | ○ | ○ | ○ | ○ |
| Smell | X | X | ○ | X | ○ | X | ○ |
| Film damage | ○ | ○ | X | ○ | X | ○ | X |

TABLE 10

| | Comparative Examples | | | | | | | |
|---|---|---|---|---|---|---|---|---|
| | 8 | 9 | 10 | 11 | 12 | 13 | 14 | 15 |
| Viscosity (mPa · s) | 42.0 | 107.3 | 37.4 | 68.2 | 28.2 | 26.1 | 34.7 | 37.6 |
| Quality of image | ○ | X | ○ | Δ | ○ | ○ | ○ | ○ |
| Discharge reliability after being left | ○ | ○ | ○ | ○ | X | X | X | X |

TABLE 10-continued

| | Comparative Examples | | | | | | | |
|---|---|---|---|---|---|---|---|---|
| | 8 | 9 | 10 | 11 | 12 | 13 | 14 | 15 |
| standing | | | | | | | | |
| Smell | X | ○ | X | ○ | ○ | ○ | ○ | ○ |
| Film damage | ○ | ○ | ○ | X | ○ | ○ | ○ | ○ |

As shown in Tables 6 to 8, the ink compositions of Examples 1 to 20 were all not higher than 60 mPa·s in viscosity at a temperature of 25° C., thus enabling these ink compositions to be discharged smoothly from the inkjet head. The images thus recorded by using these ink compositions of Examples 1 to 20 were all excellent in quality and free from white line. Further, the discharge reliability of these ink compositions after being left standing was also confined within an allowable range. Further, smelling was not recognized and the generation of damage of film of the resin file was minimized.

Especially, as shown in Examples 1 and 2, when isomyristyl alcohol having 14 carbon atoms was employed as aliphatic alcohol, it was possible, through confining the content of tetraethylene glycol monobutylether to 70 to 80 wt %, to substantially avoid the generation of damage to the film. As shown in Examples 4 and 5, when isopalmityl alcohol having 16 carbon atoms was employed as aliphatic alcohol, it was possible, through confining the content of tetraethylene glycol monobutylether to 70 to 80 wt %, to substantially avoid the generation of damage to the film.

As shown in Examples 10 and 11, when isostearyl alcohol having 18 carbon atoms was employed as aliphatic alcohol, it was possible, through confining the content of tetraethylene glycol monobutylether to 70 to 80 wt %, to obtain a normal image which was free from white line and from distortion in the lateral line.

As described above, due to the incorporation of tetraethylene glycol monobutylether at a prescribed amount, the ink compositions of these examples were capable of satisfying all of the desirable features including the viscosity at a temperature of 25° C., the quality of image, the discharge reliability after being left standing, smelling, and the inhibition of damage to film.

In the cases of the ink compositions of comparative examples however, it was impossible to secure all of these features as shown in Tables 9 and 10. As for the quality of image, the image obtained in Comparative Example 9 indicated the generation of white line. Since the viscosity at 25° C. of the ink composition of Comparative Example 9 was as high as more than 100 mPa·s, it was impossible to sufficiently lower the viscosity thereof even if the inkjet head was heated. As a result, a nozzle which was incapable of discharging the ink composition was generated. Further, even in the case of Comparative Example 11 where the viscosity at 25° C. of the ink composition thereof was about 68 mPa·s, the first lateral line was distorted corrugating in elevational direction.

As for the discharge reliability of ink composition after being left standing, the following facts have been found out. Namely, if the content of tetraethylene glycol monobutylether is decreased and the content of a low viscosity ether such as triethylene glycol monobutylether and diethylene glycol monobutylether is increased, the viscosity of ink composition can be lowered. As a result, the heating temperature of inkjet head to be set can be lowered, thereby making it possible to save the power consumption. However, if the content of the low viscosity ether in an entire quantity of solvent in the ink composition is increased, the discharge failure of ink composition will be likely to increase.

As shown in Comparative Examples 12 and 14, in the cases where tetraethylene glycol monobutylether, triethylene glycol monobutylether and aliphatic alcohol were employed, when the content of triethylene glycol monobutylether was increased to 60 wt %, discharge failure of ink composition generated as the ink composition was left standing for 15 minutes. Further, as shown in Comparative Examples 13 and 15, in the cases where tetraethylene glycol monobutylether, diethylene glycol monobutylether and aliphatic alcohol were employed, when the content of diethylene glycol monobutylether was increased to 30 wt %, discharge failure of ink composition was caused to generate as the ink composition was left standing for 15 minutes.

As for the smell of ink composition, as shown in Tables 9 and 10, the ink compositions of Comparative Examples 1, 2, 4, 6, 8 and 10 emitted bad smelling due to an excessive content of tetraethylene glycol monobutylether.

When the content in the entire solvent of tetraethylene glycol monobutylether was relatively small and the content of aliphatic alcohol was relatively large, the damage to image file was increased. When the content of isomyristyl alcohol or isopalmityl alcohol, both being aliphatic alcohol having 14 carbon atoms, as well as the content of 2-hexyldecanol, i.e. aliphatic alcohol having 16 carbon atoms, were increased to 50 wt % based on an entire quantity of solvent, the film of resin file was caused to deform to an extent of 1 mm or more as shown in Comparative Examples 3, 5 and 7. Further, when the content of oleyl alcohol, i.e. aliphatic alcohol having 18 carbon atoms, is increased to 60 wt % based on an entire quantity of solvent, the film of resin file deformed to an extent of 1 mm or more as shown in Comparative Example 11.

Even in the cases of cyan, magenta and yellow inks which have been prepared by diluting the base inks 2, 3 and 4 with a diluent solvent, the same results as described above were obtained. In order to obtain an ink composition provided with desired characteristics, the content of tetraethylene glycol monobutylether should be confined within the range of 60 to 90 wt % based on an entire quantity of the solvent if the solvent to be employed is constituted by a mixture consisting of tetraethylene glycol monobutylether and aliphatic alcohol having 14 or 16 carbon atoms. In the same sense, the content of tetraethylene glycol monobutylether should be confined within the range of 50 to 90 wt % based on an entire quantity of the solvent if the solvent to be employed is constituted by a mixture consisting of tetraethylene glycol monobutylether and aliphatic alcohol having 18 carbon atoms.

Likewise, the aforementioned limitations on the content of components are also applicable to the case where the solvent to be employed is constituted by a mixture consisting of tetraethylene glycol monobutylether, a low viscosity ether selected from diethylene glycol monobutylether and triethylene glycol monobutylether, and aliphatic alcohol. Namely, the mixing ratio between the low viscosity ether and the aliphatic alcohol was determined depending on the kinds of the low viscosity ether and on the number of carbon atoms of the aliphatic alcohol.

By using the solvent which is constituted by a specific ratio of tetraethylene glycol monobutylether and specific kind of aliphatic alcohol, or by using the solvent which is constituted by a specific ratio of tetraethylene glycol monobutylether, low viscosity ether, and specific kind of aliphatic alcohol, it was possible to obtain an inkjet ink composition satisfying all of the features including the viscosity at a temperature of 25° C., the quality of image, the discharge reliability after being left standing, uncomfortable smelling, and the inhibition of damage to film.

As described above, according to one aspect of the present invention, it is possible to provide an inkjet ink composition which is free from uncomfortable smelling and capable of exhibiting excellent discharge reliability and makes it possible to print an image of high quality on a plain paper without inviting the swelling or damage of a transparent file which is extensively employed in the office or at home.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inkjet ink composition comprising a pigment, a dispersing agent, and a solvent; wherein the solvent is constituted by 60-80 wt %, based on an entire quantity of the solvent, of tetraethylene glycol monobutylether, and the balance of aliphatic alcohol having 14 or 16 carbon atoms.

2. The inkjet ink composition according to claim 1, wherein the aliphatic alcohol having 14 or 16 carbon atoms is isomyristyl alcohol.

3. The inkjet ink composition according to claim 2, wherein the solvent comprises 70-80 wt %, based on an entire quantity of the solvent, of tetraethylene glycol monobutylether.

4. The inkjet ink composition according to claim 1, wherein the aliphatic alcohol having 14 or 16 carbon atoms is isopalmityl alcohol.

5. The inkjet ink composition according to claim 4, wherein the solvent comprises 70-80 wt %, based on an entire quantity of the solvent, of tetraethylene glycol monobutylether.

6. The inkjet ink composition according to claim 1, wherein the aliphatic alcohol having 14 or 16 carbon atoms is 2-hexyldecanol.

7. An inkjet ink composition comprising a pigment, a dispersing agent, and a solvent; wherein the solvent is constituted by 50-80 wt %, based on an entire quantity of the solvent, of tetraethylene glycol monobutylether, and the balance of aliphatic alcohol having 18 carbon atoms.

8. The inkjet ink composition according to claim 7, wherein the aliphatic alcohol having 18 carbon atoms is isostearyl alcohol.

9. The inkjet ink composition according to claim 8, wherein the solvent comprises 70-80 wt %, based on an entire quantity of the solvent, of tetraethylene glycol monobutylether.

10. The inkjet ink composition according to claim 7, wherein the aliphatic alcohol having 18 carbon atoms is oleyl alcohol.

11. An inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and triethylene glycol monobutylether, and the balance of aliphatic alcohol having 14 or 16 carbon atoms, the content of the triethylene glycol monobutylether being not more than 50 wt % based on an entire quantity of the solvent.

12. An inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and diethylene glycol monobutylether, and the balance of aliphatic alcohol having 14 or 16 carbon atoms, the content of the diethylene glycol monobutylether being not more than 20 wt % based on an entire quantity of the solvent.

13. An inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and triethylene glycol monobutylether, and the balance of aliphatic alcohol having 18 carbon atoms, the content of the triethylene glycol monobutylether being not more than 50 wt % based on an entire quantity of the solvent.

14. An inkjet ink composition comprising a pigment, a dispersing agent, and a solvent; wherein the solvent is constituted by 60-80 wt %, based on an entire quantity of the solvent, of polyalkylene glycol monoether comprising tetraethylene glycol monobutylether and diethylene glycol monobutylether, and the balance of aliphatic alcohol having 18 carbon atoms, the content of the diethylene glycol monobutylether being not more than 20 wt % based on an entire quantity of the solvent.

* * * * *